US012674721B2

(12) United States Patent　　(10) Patent No.: US 12,674,721 B2
Meis et al.　　(45) Date of Patent: Jul. 7, 2026

(54) OPERATING METHOD FOR TRANSMISSIONS

(71) Applicant: FLENDER GMBH, Bocholt (DE)

(72) Inventors: Jean-Andre Meis, Duelmen (DE);
Carsten Hussmann, Bocholt (DE);
Markus Uhlending, Hennef (DE)

(73) Assignee: Flender GmbH, Bocholt (DE)

( * ) Notice: Subject to any disclaimer, the term of this patent is extended or adjusted under 35 U.S.C. 154(b) by 993 days.

(21) Appl. No.: 17/288,335

(22) PCT Filed: Sep. 18, 2019

(86) PCT No.: PCT/EP2019/074990
§ 371 (c)(1),
(2) Date: Apr. 23, 2021

(87) PCT Pub. No.: WO2020/083573
PCT Pub. Date: Apr. 30, 2020

(65) Prior Publication Data
US 2021/0381928 A1　　Dec. 9, 2021

(30) Foreign Application Priority Data
Oct. 26, 2018　(EP) .................................... 18202907

(51) Int. Cl.
*G01M 13/02* (2019.01)
*G06Q 10/087* (2023.01)
*G06Q 10/20* (2023.01)

(52) U.S. Cl.
CPC .......... *G01M 13/02* (2013.01); *G06Q 10/087* (2013.01); *G06Q 10/20* (2013.01)

(58) Field of Classification Search
CPC ...... G01H 1/003; G01M 13/00; G01M 13/02; G06Q 10/087; G06Q 10/20
See application file for complete search history.

(56) References Cited

U.S. PATENT DOCUMENTS 5,210,704 A 　5/1993　Husseiny
6,745,153 B2 * 6/2004　White ................. B60R 16/0215
　　　　　　　　　　　　　　　　　702/182

(Continued)

FOREIGN PATENT DOCUMENTS

CN　　101025804 A　　8/2007
CN　　102016736 A　　4/2011

(Continued)

OTHER PUBLICATIONS

International Search Report issued on Dec. 11, 2019 by the European Patent Office in International Application PCT/EP2019/074990.

(Continued)

*Primary Examiner* — Yoshihisa Ishizuka
(74) *Attorney, Agent, or Firm* — Henry M. Feiereisen LLC

(57) ABSTRACT

In an operating method for a transmission having a plurality of transmission components, an operating state of the transmission is established and a mechanical stress on a first transmission component is detected. An amount of damage to the first transmission component then determined based on the detected mechanical stress for a first damage mechanism and added to a defect total using a first defect accumulation model. A model-based remaining useful life of the first transmission component and a probability of occurrence are determined based on the first defect accumulation model. The probability of occurrence for the model-based remaining useful life is determined based on data sets of comparison components having an identical construction to the first transmission component. A corresponding computer program product, a control unit, a monitoring system and a transmission application operating according to the method are also described.

12 Claims, 6 Drawing Sheets

(56)  References Cited

U.S. PATENT DOCUMENTS

| | | | | |
|---|---|---|---|---|
| 6,834,256 | B2 * | 12/2004 | House | G01R 31/343 |
| | | | | 702/179 |
| 7,149,657 | B2 | 12/2006 | Goebel et al. | |
| 7,606,673 | B2 | 10/2009 | Judd | |
| 2004/0260512 | A1 | 12/2004 | Olsson et al. | |
| 2007/0198215 | A1 | 8/2007 | Bonanni et al. | |
| 2010/0089163 | A1 | 4/2010 | Engelbreit | |
| 2012/0029838 | A1 | 2/2012 | Hallman et al. | |
| 2014/0046881 | A1 * | 2/2014 | Losl | G06N 20/00 |
| | | | | 706/14 |

FOREIGN PATENT DOCUMENTS

| | | |
|---|---|---|
| CN | ON 104285137 A | 1/2015 |
| DE | 102007017614 | 10/2008 |
| EP | 2 264 314 | 12/2010 |

OTHER PUBLICATIONS

Chinese Search Report issued on Jan. 17, 2023 in Chinese Patent Application No. 2019800704621.
Translation of Chinese Search Report issued on Jan. 17, 2023 in Chinese Patent Application No. 2019800704621.

* cited by examiner

OPERATING METHOD FOR TRANSMISSIONS

CROSS-REFERENCES TO RELATED APPLICATIONS

This application is the U.S. National Stage of International Application No. PCT/EP2019/074990, filed Sep. 18 2019, which designated the United States and has been published as International Publication No. WO 2020/083573 A1 and which claims the priority of European Patent Application, Serial No. 18202907.4, filed Oct. 26, 2018, pursuant to 35 U.S.C. 119(a)-(d).

BACKGROUND OF THE INVENTION

The invention relates to an operating method for a transmission, by means of which a time of failure that is subject to probability can be predicted for a transmission component. The invention also relates to a computer program product by means of which the claimed operating method can be implemented. The invention equally relates to a control unit for a transmission, said control unit being provided with a corresponding computer program product. The invention likewise relates to a monitoring system which includes such a control unit. The invention further relates to a transmission that can be linked to such a monitoring system, and to a transmission application that is equipped with a corresponding transmission.

US 2012/0029838 A1 discloses a transmission of a turbine, said transmission being equipped with a plurality of acceleration sensors and rotational speed sensors. These are used to generate measured data which indicates a vibration state and a rotational speed of at least one shaft. The acceleration sensors and rotational speed sensors are connected to a control unit, and a computer program is used for the purpose of evaluation. On this basis, a current damage state of the transmission is ascertained by the computer program.

The publication U.S. Pat. No. 7,606,673 B2 discloses a method for analyzing vibrations of a bearing. In this case, a degradation factor is ascertained and combined with a mean-time-to-failure (MTTF). A reduced-mean-time-to-failure (RMTTF) is ascertained therefrom. The degradation factor itself is ascertained on the basis of discriminants from a frequency analysis. A failure probability for the bearing is then ascertained on the basis of the RMTTF. In the method according to U.S. Pat. No. 7,606,673 B2, the impending financial consequences of a failure of the bearing and the actual repair costs are also ascertained and displayed to a user.

The document DE 10 2007 017 614 A1 discloses an operating method for transmissions, in which a defect accumulation is ascertained for rotating components of the transmission. A load collective is also ascertained. A component to be analyzed is divided into a plurality of sections and individual load collectives are ascertained accordingly.

When operating transmission applications, in particular wind turbines or industrial applications, it is endeavored to achieve an increasingly accurate forecast of impending failures of transmission components and an associated assessment of the consequences. Known methods for forecasting a component failure have the disadvantage that their predictive accuracy lags behind the ever-increasing demands. There is a requirement in transmissions for means by which the imminent failure of a transmission component can be forecast more reliably, and which can be implemented in a simple and cost-efficient manner.

SUMMARY OF THE INVENTION

The object is achieved by the operating method according to the invention. The operating method is used to operate a transmission comprising a plurality of transmission components. Transmission components are understood to mean e.g. spur gears, bevel gears, planet gears, planet gear carriers, ring gears, sun gears, associated shafts or axes, seals, plain and rolling bearings, torque brackets, screws, shaft-hub connections, feather key connections, short-addendum teeth or housing components. In a first step of the inventive method, an operating state of the transmission is established. An operating state in this case is a state of the transmission in which in particular a mechanical state of the transmission can be described by means of sensor data. This can be a steady operating state, but can also be a transient event such as an acceleration phase, for example. During the operating state, a mechanical stress on a first transmission component is detected. The mechanical stress corresponds to the current operating state in this case. Such a mechanical stress on a first transmission component can be a torsional stress on a sun shaft, a radial force acting on a plain bearing or a rotational speed of a planet gear, for example. The mechanical stress can, as in the case of a rotational speed of a planet gear, be ascertained directly or derived indirectly via a physical model from measured data that has been captured directly. This can be a torsional stress on a sun shaft, for example, which is ascertained with the aid of a strain gauge from a strain that is present on its surface. In a second step, on the basis of the mechanical stress that has been ascertained, an amount of damage for a first damage mechanism is ascertained. A rising and falling mechanical tension at the first transmission component can be detected and evaluated as e.g. service-life-consuming stress, i.e. an amount of damage, in the context of so-called low-cycle fatigue (LCF) or so-called high-cycle fatigue. Alternatively or additionally, the first damage mechanism can also take the form of wear, tooth breakage or pitting at a toothed gearing. According to the invention, the amount of damage is ascertained for at least the first damage mechanism. The first damage mechanism, i.e. the type of damage event, can be configured in this case, wherein said configuration can be effected by an algorithm, a table, or a user input.

In a third step, the amount of damage is added to a defect total in a first defect accumulation model for the first damage mechanism. Such defect accumulation models exist for a multiplicity of damage mechanisms, e.g. the linear defect accumulation according to Palmgren and Miner. This addition is understood to be an increment in the sense of the corresponding defect accumulation model, such that the progression of the first damage mechanism is ascertained in the third step by means of the defect total. On the basis of the current defect total, a fourth step is performed. In the fourth step, a model remaining useful life of the first transmission component is ascertained on the basis of the first defect accumulation model. In this case, the model remaining useful life is based on an existing theoretical description of the first damage model. An anticipated defect total at which a failure of the first transmission component is theoretically expected is taken into account in this case. On the basis of the theoretical model for the first damage mechanism, by means of which the model remaining useful life is ascertained, an occurrence probability of achieving the model remaining useful life of the first transmission component is also ascertained. The occurrence probability describes, for example, the probability that the first transmission component will achieve the model remaining useful life as forecast.

According to the invention, the occurrence probability for the model remaining useful life is ascertained with reference to data sets which are collected at comparison components. The comparison components are of essentially identical construction to the first transmission component. For the purpose of collecting the data sets, the comparison components were or are subjected to stresses and the damage response, in particular the failure of the corresponding comparison component, is detected. On the basis of the plurality of comparison components and the corresponding data sets, it is possible by means of statistical evaluation to ascertain a maximum defect total, i.e. the tolerable damage until failure, of the comparison components and of the first transmission component. This in turn gives an indication of the probability of a maximum defect total that is actually tolerable for the first transmission component, and therefore of the occurrence probability that the model remaining useful life can be achieved by the first transmission component. The inventive method therefore makes it possible to transfer experience from comparison components having identical construction to the relevant first transmission component. The model remaining useful life that has been ascertained and/or the corresponding occurrence probability in this case can be displayed to a user on a screen or display, for example, for the purpose of monitoring the operation of the transmission. During the operation of long-duration transmission applications such as e.g. wind turbines or industrial applications, the accuracy of forecasting the failure of transmission components increases. The longer the relevant operating method runs, the more precise its forecasts due to the increasing experience of comparison components. In view of the generally increasing need for repair of transmission applications as they become older, the maintenance of the transmission applications can be planned more effectively and therefore becomes more economical by virtue of the method according to the invention. The economically viable service life of transmissions is thereby extended overall.

The claimed operating method can also include a fifth step, in which a warning is output if the model remaining useful life falls below a configurable first threshold value and/or the occurrence probability falls below a configurable second threshold value. Falling below the first threshold value can therefore warn of an anticipated failure of the transmission component in the near future. Falling below the second threshold value shows that it is now sufficiently improbable that a configurable desired remaining useful life will be reached. Using a combination of first and second threshold values, a user can configure a warning profile which allows advantageous operation of the transmission, in which unforeseen failures are avoided. By this means, it is possible overall to achieve even more reliable and economical operation of the transmission.

Furthermore, at least some of the comparison components on the basis of whose data sets the occurrence probability for the model remaining useful life is ascertained may be deployed outside the transmission. The comparison components are therefore deployed in other transmissions which might belong to a different transmission application. Other transmission in this case is understood to mean any transmission which is not the actual transmission described here. The transmission application in which the transmission operated using the claimed method is deployed can be a different transmission application. For example, for rolling bearings, shafts or housing components, it is possible to deploy data sets from corresponding transmission components which are deployed in vehicle transmissions. As a result of the high unit volumes in vehicle engineering, it is easy to provide a multiplicity of data sets which allow a reliable assessment of the corresponding damage mechanism. Alternatively or additionally, data sets of comparison components can be obtained by means of measurements at a test station in which a corresponding reference machine is operated. The data sets of the comparison components are made available to the claimed method in a storage entity for retrieval via a data connection, for example. The operating method is therefore able to use an increased number of comparison components on the basis of which the occurrence probability for the model remaining useful life is ascertained. The greater the number of comparison components available, the faster a basis of assessment for the occurrence probability grows, which in turn allows the occurrence probability to be ascertained more precisely. In particular, it is thus possible to include rarely occurring defect events when ascertaining the occurrence probability, which also increases the accuracy with which the occurrence probability is ascertained.

In the claimed operating method, it is also possible in the second step to ascertain a mechanical stress on a second transmission component on the basis of the mechanical stress on the first transmission component in combination with a transfer function. In this case, the transfer function is designed such that a physical relationship is specified between the first and second transmission component. For example, on the basis of a radial stress of a rang bearing on a planet gear axle, a static deflection of the planet gear axle can be ascertained. Likewise, a transfer function can be obtained from a finite-element model of at least one housing component. Furthermore, a bearing response can be ascertained by freeing a shaft that is stressed by a torsional moment. In this case, such a physical relationship can preferably be reproduced in a digital twin of at least one module of the transmission or of the overall transmission. On the basis of the mechanical stress on the second transmission component, at least the third and fourth steps are performed and a model remaining useful life and an associated occurrence probability are thus ascertained for the second transmission component. Corresponding ascertainments are effected accordingly on the basis of data sets of comparison components which have an essentially identical construction to the second transmission component. The claimed method is therefore suitable for using and further evaluating measured data that is available. This means that further transmission components do not have to be equipped with sensors. The functional scope of the claimed operating method is thereby increased in a simple and cost-efficient manner.

Furthermore, it is also possible in the second step of the claimed operating method, on the basis of the mechanical stress on the first transmission component, to ascertain an amount of damage for a second damage mechanism. On the basis of this amount of damage, the third and fourth steps are also performed, i.e. a defect total, a model remaining useful life and a corresponding occurrence probability are ascertained for a second damage mechanism which acts on the first transmission component. By means of monitoring and evaluating a plurality of damage mechanisms, a more flexible forecast of a failure of the first transmission component is possible. For example, in the case of fluctuating stresses at the first transmission component, high-cycle fatigue and low-cycle fatigue can be monitored simultaneously with different frequencies. Moreover, wear, tooth root breakage or pitting at a toothed gearing can be monitored as a damage mechanism. The versatility thus obtained of the claimed operating method further increases the predictive accuracy thereof. In a further step, it is additionally possible to detect which damage mechanism will cause the first and/or second transmission component to fail. It is thereby possible to check whether the first and/or second damage mechanism has been correctly selected for the corresponding transmission component. Corresponding data can be provided as a data set, such that the existing experience base can be enlarged automatically for the corresponding transmission component. The accuracy of a damage prediction is further increased thereby.

In a further embodiment variant of the claimed operating method, the occurrence probability for the mod& remaining useful life is ascertained by means of a distribution function of permitted defect totals of the comparison components. The permitted defect totals are understood to be the aggregated amounts of damage at which a failure of the corresponding comparison component occurred. It is possible by means of the distribution function to ascertain which permitted defect total, i.e. maximum defect total, can be expected for the first transmission component, and the probability thereof. This comprises e.g. a stress-number curve for a comparison component, said stress-number curve being individual to the respective comparison component and relating to a specific damage mechanism. The data sets of the comparison components, which are used to ascertain the occurrence probability of the model remaining useful life, can comprise the respective stress-number curves and/or permitted defect totals, i.e. maximum defect totals. Furthermore, the data sets can also include information about the type of corresponding damage mechanism, in particular information about a dominant damage mechanism. A dominant damage mechanism in this case is understood to be the damage mechanism which is expected to result in the failure of the transmission component, and is therefore dimensioned for the transmission component. In addition, the specification of a dominant damage mechanism specifically for different applications can be stored in the data set. An expectation horizon for the failure of the transmission component can be described more accurately thereby.

In the claimed operating method, the current defect total can also be designed to be modifiable during the execution of the method. The defect total can therefore be corrected during the operation, e.g. in order to take defect events into account which are not shown by measured data at the first or one of the further transmission components. Likewise, measures which extend useful life can be taken into account by means of a corresponding change. This can be a change of transmission oil or a replacement of a transmission component, for example. The change of the defect total can be effected by an algorithm, for example, by means of which maintenance events can be recorded. Alternatively or additionally, the defect total can also be changed by a user input. The claimed operating method is therefore capable of indicating the current operation of the transmission more comprehensively and increasing its predictive accuracy thereby.

In a further step of the claimed operating method, on the basis of the model remaining useful life of the first transmission component and/or the occurrence probability thereof, it is possible to ascertain an anticipated repair cost for the first transmission component and/or the transmission. The repair cost can be ascertained by interrogating an experience database, for example, in which is stored data relating to working time required, tools required, procurement time for a spare part, and/or spare part costs for the replacement of the first transmission component. Alternatively or additionally, expected consequential costs of failure are ascertained, i.e. costs which can be expected in the event of a failure of the first transmission component. These include in particular idle times of the transmission and/or the associated transmission application. This allows a user to plan a maintenance event for the transmission or transmission component in a targeted manner.

In a further embodiment variant of the claimed operating method, a stock level statement can be output for the first transmission component if the model remaining useful life falls below the configurable first threshold value and/or the occurrence probability falls below a configurable second threshold value. The stock level statement can be designed as a message or an instruction to materials management software, such that procurement of a spare part for the first transmission component is initiated as a result of the stock level statement. Alternatively or additionally, further data can also be taken into account in addition to the first and/or second threshold value, e.g. a procurement time or available capacity of maintenance personnel. In particular, falling below the first and/or second threshold value can be associated with the stock level statement. This allows the operation of the corresponding transmission and its corresponding transmission components to be monitored more accurately.

Furthermore, the claimed operating method can ascertain the model remaining useful life and/or the occurrence probability thereof on the basis of a configurable load level for continued operation. In this case, the load level characterizes the anticipated mechanical stresses on the first transmission component. The configurable load level can be designed as an extrapolation of a load level that was present in previous operation. Alternatively, the configurable load level can also correspond to a planned operating mode of the transmission. Alternatively again, the configurable load level can be designed as a sectional combination of a previously present load level and a load level which corresponds to the planned operating mode. The configuration of the load level for the continued operation can be performed by means of an algorithm, a table and/or a user input. An algorithm for configuring the load level for continued operation can be linked to e.g. work scheduling software in the context of an industrial application. In the case of a wind turbine, such an algorithm can be designed as a forecast on the basis of a weather database.

Furthermore, in the claimed operating method at least one mechanical stress, at least one amount of damage, at least one defect total, at least one type detail about a first damage mechanism, at least one model remaining useful life and/or the occurrence probability thereof can be stored in a data set. The data set can be saved in a storage entity, for example, which is arranged outside the transmission or transmission application. The data set thus saved can be modified by a user subsequently. The data set thus saved can also be provided as a comparison data set for further transmission components having an essentially identical construction. The first transmission component monitored by the claimed operating method therefore serves as a comparison component for other transmission components. The interaction of a multiplicity of identically constructed transmission components means that it is possible to generate an experience database which allows a precise forecast in relation to the corresponding transmission components for a multiplicity of application scenarios. Furthermore, the corresponding availability of multiple data sets from identically constructed transmission components allows a so-called big-data analysis to be performed, by means of which systematically occurring damages can be ascertained. These can be early failures of a specific bearing, for example. Such a big-data analysis in particular allows existing designs to be improved and therefore allows an existing model range of transmissions to be maintained in a targeted manner. Furthermore, data sets of comparison components can be used as inputs for a machine-learning algorithm, and used by the machine-learning algorithm to identify patterns of damage which result in premature damage, for example. A further benefit is therefore derived from the data sets generated by the claimed method.

The object of the invention is also achieved by the inventive computer program product. The computer program product can be stored in non-volatile form on a data medium such as e.g. a hard disk, a USB storage entity or an optical data medium and can be executed by a corresponding computing unit. The inventive computer program product is designed to implement an operating method according to at least one of the embodiment variants outlined above for the operation of a transmission. To this end, the inventive computer program product comprises at least one first part-program. The at least one first part-program is designed to implement the claimed operating method either entirely or partially. In the case of a partial implementation of the operating method, the first part-program is communicatively connected to a second part-program at least temporarily. In this case, a communicative connection of the part-programs is understood to mean a link which allows one-way or two-way data transfer, e.g. an Internet connection. Various functions of the fundamental method can therefore be realized by the first or second part-program. For example, a configuration of a threshold value or a defect total can be effected by the second part-program, while the matching with these threshold values or defect totals is performed in the first part-program. This means that the inventive solution can be modularized and can therefore be produced in a simple format.

The fundamental object of the invention is likewise achieved by the inventive control unit for a transmission. The control unit has a storage entity and a computing unit, these being designed to execute a computer program product. Furthermore, the control unit can be directly or indirectly connected to a plurality of sensors by means of which the first transmission component can be monitored. The control unit is also designed to receive and evaluate associated measured data from the sensors. According to the invention, the control unit is equipped with a computer program product as per one of the embodiment variants described above, and is therefore suitable for implementing the inventive operating method.

Furthermore, the claimed control unit for a transmission can be designed as an internal control unit or as a supervisory control unit. An internal control unit is provided at the transmission or the associated transmission application thereof. This can involve installation in or on a housing of the transmission, or on a machine chassis to which the transmission is secured. A supervisory control unit in turn can be installed separately from the associated transmission at another location. For example, the supervisory control unit can be designed as a programmable logic controller (PLC), a host computer, a web server or a computer cloud. It is likewise also possible for at least one internal and one supervisory control unit to be provided in order to implement the inventive operating method. In this case, the internal and the supervisory control unit are connected together at least for the purpose of a temporary communicative connection.

The fundamental object of the invention is likewise achieved by the inventive monitoring system, this being designed to monitor at least a first transmission component. The monitoring system comprises a plurality of sensors, each of which is designed to detect measured data. In this case, the measured data that can be ascertained by means of the sensors corresponds to at least one mechanical stress to which the first transmission component is subjected during operation of the transmission. This can be a rotational speed and a radial stress of a rolling bearing, for example. The monitoring system also comprises at least one control unit, which is connected to the plurality of sensors and is designed to receive and evaluate the measured data thereof. The at least one control unit is designed as an internal control unit or as a supervisory control unit within the meaning of one of the embodiment variants outlined above. Alternatively, the monitoring system can also have an internal and a supervisory control unit, which are communicatively connected to each other at least temporarily. In addition, the monitoring system can optionally be equipped with a store of patterns containing a plurality of reference states which can be used for further evaluation of a current operating state.

The object of the invention is further achieved by the inventive transmission. The transmission comprises a plurality of transmission components and is designed as a planetary gearing, a spur gearing or a bevel gearing. The transmission comprises at least one first transmission component and is linked to at least one sensor, said sensor being assigned to a monitoring system. The monitoring system is designed in accordance with one of the embodiment variants described above. The inventive transmission can therefore be monitored by means of the operating method described above, and any impending damage to the first transmission component can therefore be reliably predicted.

The fundamental object of the invention is likewise achieved by the inventive transmission application, this comprising a drive unit and a driven unit. A transmission is so arranged as to transfer torque between the drive unit and the driven unit, and is designed to effect a change in rotational speed from the drive unit to the driven unit. The drive unit in this case can be designed as a wind rotor, an electric motor, a combustion engine or a hydraulic motor, for example. The driven unit can be designed as a generator or as a mechanical application such as a tube mill, a cement mill, a vertical mill, an extruder, a conveyor belt, a pump, a compressor, a lifting device, a scrap baling press or waste packer, for example. Alternatively again, the driven unit can also take the form of a shaft of a vehicle drive mechanism. Accordingly, the transmission application takes the form of a wind turbine, an industrial application, a land vehicle, a watercraft or an aircraft. An industrial application in this case can take the form of a mill, vertical mill, sugar mill, cement mill, stone crusher, conveyor belt, pump, roller press, slat conveyor, tube mill, rotary tubular kiln, slewing gear, mixer, lifting device, waste packer or scrap baling press. According to the invention, the transmission is designed in accordance with one of the embodiment variants outline above. As result of using the inventive operating method, more reliable operation of the transmission is achieved, thereby increasing the degree of failure protection in the transmission applications.

BRIEF DESCRIPTION OF THE DRAWING

The invention is described below with reference to individual embodiment variants. The features of the individual embodiment variants can be combined with each other in this case. The figures are mutually complementary to the extent that the same reference characters in the figures also have the same technical significance, wherein.

DETAILED DESCRIPTION OF PREFERRED EMBODIMENTS

Figure 1:
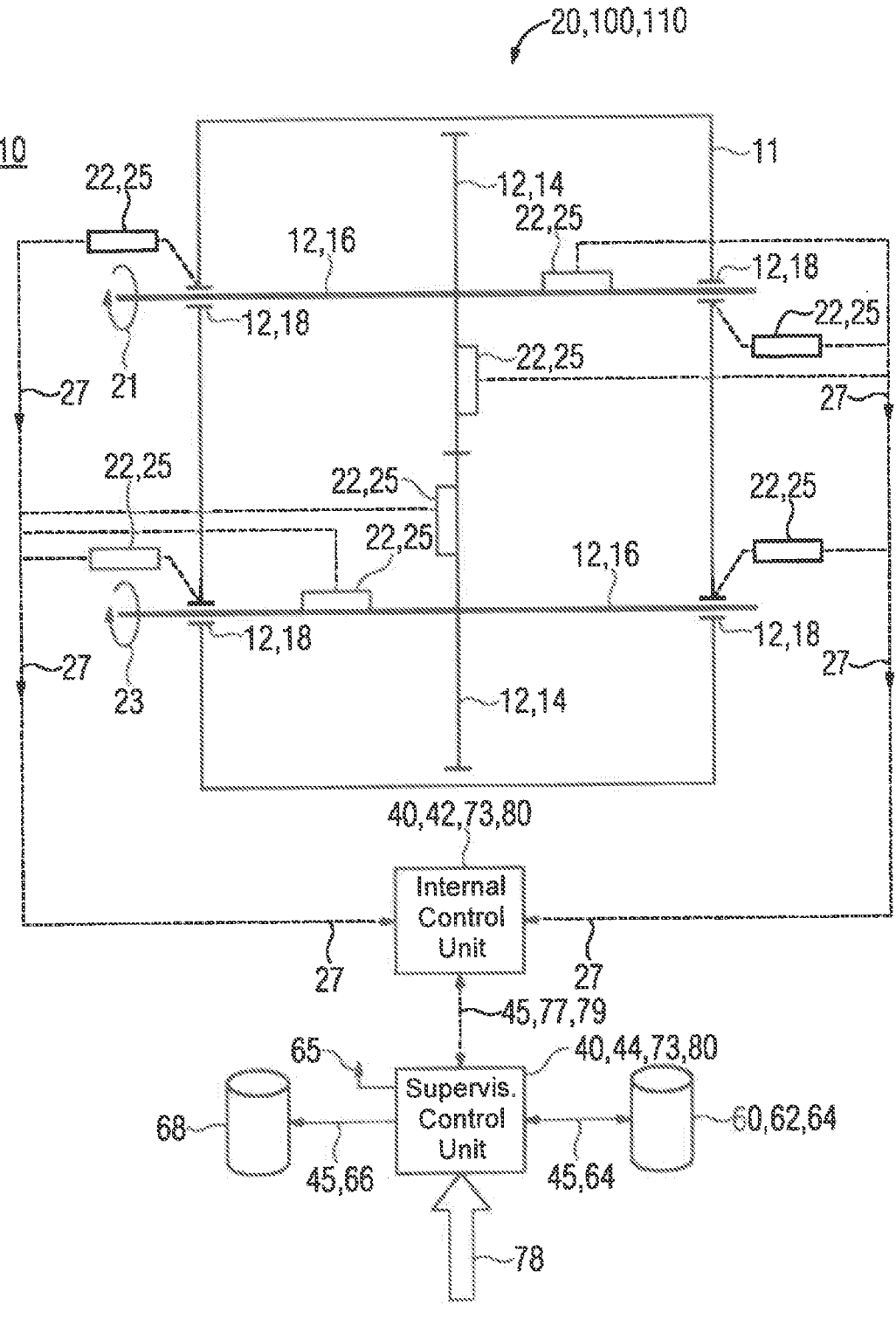
FIG. 1 shows a schematic structure of a first embodiment variant of the claimed transmission.

FIG. 1 schematically shows a structure of a first embodiment variant of a claimed transmission 10, including sensors 22 and a control unit 40 in the form of an internal control unit 42, by means of which the claimed method 100 is implemented. The transmission 10 comprises a housing 11, in or on which are arranged a plurality of transmission components 12. The transmission components 12 take the form of gearwheels 14, shafts 16 and bearings 18. Without restricting the general applicability of the invention, the transmission 10 is designed as a spur gear transmission in FIG. 1. The gearwheels 14 are mounted on the shafts 16, which in turn are rotatably mounted in bearings 18. The bearings 18 are secured to the housing 11. Each of the transmission components 12, i.e. each gearwheel 14, each shaft 16 and each bearing 18, is provided with a sensor 22 which is suitable for indirectly or directly detecting a mechanical stress 25 on the corresponding transmission component 12 during operation of the transmission 10. To this end, the sensors 22 are designed as strain gauges, force transducers, temperature sensors, rotational speed sensors, surface acoustic wave (SAW) sensors, cameras, or a combination of these. Direct detection of a mechanical stress 25 is understood to mean e.g. detecting a strain at a surface of a shaft 16 by means of a strain gauge or a SAW sensor. Indirect detection of a mechanical stress 25 is understood to mean e.g. detecting a temperature of a bearing 18, wherein a thermal strain state of the bearing can be ascertained by means of a corresponding model on the basis of the detected temperature. The sensors 22 are designed to correspondingly generate measured data 27 which is transferred to a control unit 40. In the case of indirect detection of the mechanical stress 25 on a transmission component 12, the mechanical stress 25 can be ascertained by at least one of the control units 40 from the received measured data 27.

The internal control unit 42 is connected to a further control unit 40, which is designed as a supervisory control unit 44. The control units 40 are communicatively linked to each other via a data connection 45. A computer program product 80 is executably stored in non-volatile form on both control units 40 and is also executed during the operation of the transmission 10. The computer program products 80 are suitable for processing the received measured data 27 and are designed to implement the inventive method 100 at the transmission 10 by means of the measured data 27. It is also possible via the data connection 45 to exchange parameters 73, by means of which the execution of the method 100 is influenced, between the internal control unit 42 and the supervisory control unit 44. The parameters 73 which are used in the internal control unit 42 for the execution of the method 100 can therefore be configured in respect of type and value by the supervisory control unit 44 as specifications 77. Specifications 77 for the method 100 that are specified by an algorithm 79 can likewise be exchanged between the supervisory control unit 44 and the internal control unit 42. In this case, such an algorithm 79 can be executed on the internal control unit 42 and the supervisory control unit 44. The specifications 77 can also be generated by means of a user input 78 which takes place at the supervisory control unit 44. The supervisory control unit 44 is also communicatively linked to a database 60 via a data connection 45. In the database 60 are stored data sets 64 of comparison components 62, which can also be forwarded to the internal control unit 42 as parameters 73. The data sets 64 of the comparison components 62 are used as comparison values for the purpose of performing the inventive method 100. These are comparison components 62 which have a largely identical construction to the corresponding transmission component 12 that is to be monitored by the method 100. The supervisory control unit 44 is also communicatively connected to a materials management system 68 via a data connection 45. The supervisory control unit 44 is designed to output a stock level statement 66 to the materials management system 68 in order thus to allow a corresponding spare part to be reserved or procured in the event of an impending failure of a transmission component 12, for example. The supervisory control unit 44 is equally suitable for outputting a warning 65 to a user if the method 100 ascertains that a failure of a transmission component 12 is imminent.

FIG. 1 illustrates the transmission 10 in an operating state 20 in which a first method step 110 is performed. Driving power 21 is supplied which, allowing for mechanical losses, is then output by the transmission 10 as output power 23. As a result of the driving power 21, mechanical stresses 25 that are detected by the sensors 22 occur in the transmission components 12. The operating state 20 from which the method 100 starts in the first method step 110 is understood to be an operating state in which measured data 27 that is useful in the context of the method 100 is generated by the sensors 22. In this case, the operating state 20 can be a steady operating state or a transient event, e.g. an acceleration.

Figure 2:
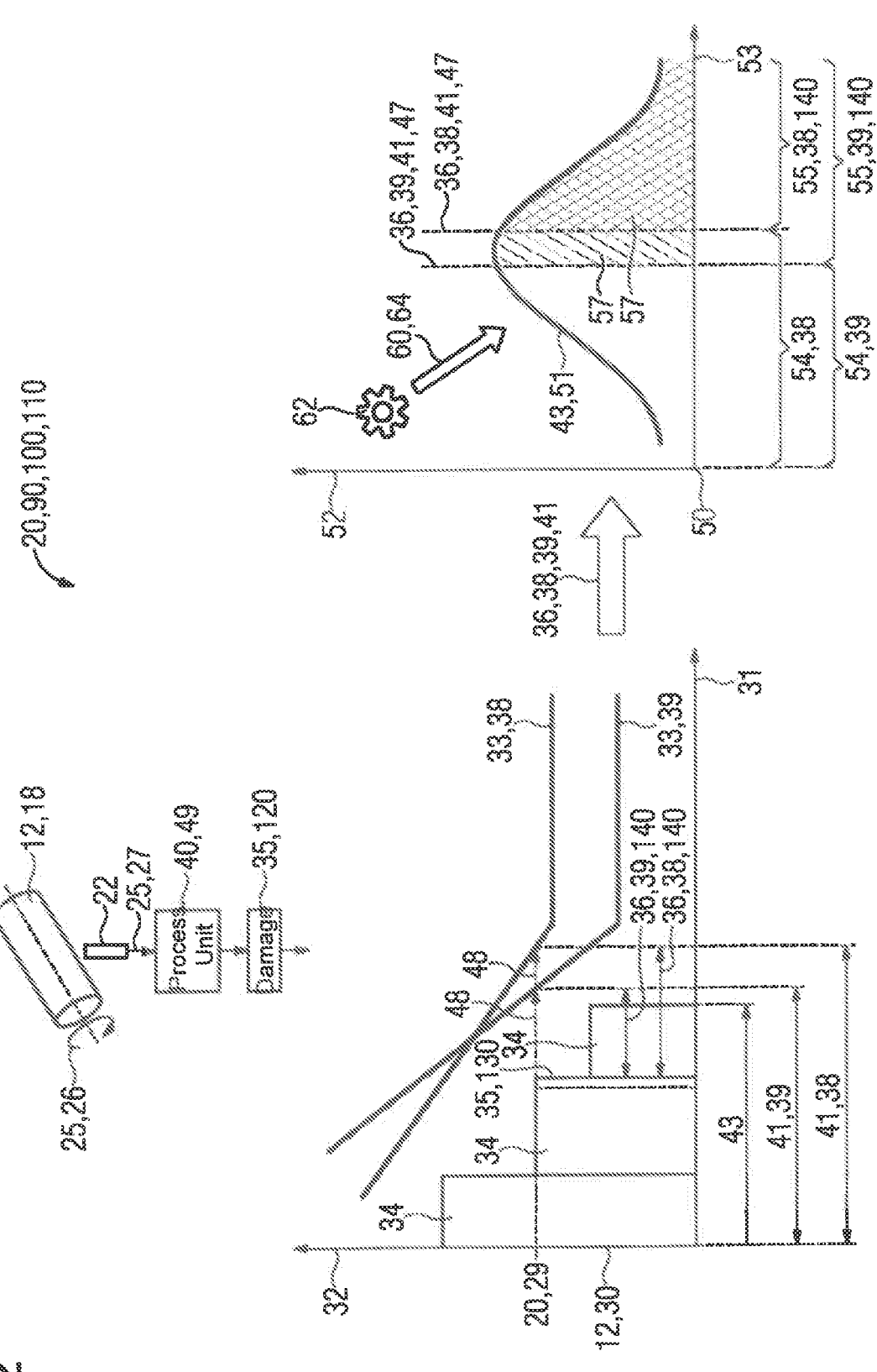
FIG. 2 shows a schematic execution of a first embodiment variant of the claimed method.

FIG. 2 schematically illustrates a further execution of an embodiment variant of the claimed method 100 which is executed at a transmission component 12 as shown in FIG. 1. In this case, the transmission component 12 is a shaft 18 which is linked to a sensor 22. The transmission component 12, i.e. the shaft 18, is subjected to a torsional load 26 during an operating state 20 that is present in a first method step 110. As a result of the torsional load 26, a mechanical stress 25 on the shaft 18 is produced, and captured in the form of measured data 27 and sent to a processing unit 49 of the control unit 40. By means of the processing unit 49, which can be assigned individually or modularly to the internal and/or the supervisory control unit 42, 44, an amount of damage 35 is ascertained in a second method step 120. The amount of damage 35 corresponds in this case to a damage of the monitored transmission component 12, i.e. the shaft 18, which was caused by the detected mechanical stress 25. The ascertainment of the amount of damage 35 takes place in the context of a respective defect accumulation model 30, which can be configured for the transmission component 12.

The defect accumulation model 30 for the corresponding transmission component 12 is illustrated in FIG. 2 by the left-hand diagram. It comprises a horizontal load-cycle-alternation axis 31 and a vertical intensity axis 32 for relevant load cycles. The defect accumulation model 30 also has model limit lines 33, each of which is assigned to a first or second damage mechanism 38, 39. The model limit lines 33 specify in each case the defect total 43 that is assumed by the defect accumulation model 30 to signify a failure of the transmission component 12 as a result of the corresponding damage mechanism 38, 39. This can be e.g. LCF and HCF, wear, tooth root breakage or pitting at a toothed gearing. In a third method step 130, the amount of damage 35 that is ascertained in the second method step 120 and occurs in the operating state 20 is added in the current defect accumulation model 30 to an existing defect total 43 in a defect group 34. As shown in FIG. 1, the defect total 43 is an aggregation of damages in individual defect groups 34 of different intensity. In a fourth method step 140 following thereupon, the model remaining useful life 36 of the transmission component 12 is ascertained for a configurable load level 29. This ascertainment of the model remaining useful life 36 is also illustrated in FIG. 2 by the arrows 48, whose lengths extend from a block of the corresponding defect group 34, this corresponding to the load level 29, to the model limit line 33 of the first or second damage mechanism 38, 39. Corresponding model total useful lives 41 of the transmission component 12 are then derived from the corresponding model remaining useful lives 36 for the first and second damage mechanisms 38, 39 respectively.

On the basis of the model remaining useful lives 36 for the first and second damage mechanism 38, 39, and therefore the model total useful lives 41 of the transmission component 12, the occurrence probabilities 57 that the transmission component 12 will actually achieve the corresponding model total useful life 41 are ascertained. This is illustrated in FIG. 2 in the right-hand distribution diagram 50, which comprises a horizontal useful life axis 53 and a vertical frequency axis 52. The diagram also features a curve of a distribution function 51 that indicates the frequency with which a specific defect total 43 is reached during operation in the case of comparison components 62 having an identical construction to the transmission component 12. In the fourth method step 140, a vertical line 47 in the distribution diagram 50 specifies which model total useful life 41 is required by the transmission component 12 in the case of a first or second damage mechanism 38, 39 and a previously ascertained model remaining useful life 36. This results in a survival region 55 and a failure region 54 in the distribution diagram 50 for each of the damage mechanisms 38, 39. The respective area under the distribution function 51 in the corresponding survival region 55 corresponds to an occurrence probability 57 with which the transmission component 12 will surpass a required model remaining useful life 36 for the respective damage mechanism 38, 39. It is consequently possible to establish the probability with which the transmission component 12 will also achieve the required model remaining useful life 36. The distribution function 51 is specified by a plurality of data sets 64 of comparison components 62 which are stored in a database 60. The data sets 64 are continuously updated by means of a multiplicity of comparison components 62, so that experiences of users of identically constructed comparison components 62 can be used for the transmission component 12. By means of a distribution function 51 which is updated in this way, it is possible inter glia to make use of unexpectedly long useful lives, i.e. unexpectedly high defect totals 43 before failure, of transmission components 12 during operation. Conversely, surprisingly short useful lives, i.e. low defect totals

43 before failure, can be taken into consideration. By means of continuously updating the distribution function 51 using comparison components 62, a dynamic monitoring system 90 is realized which becomes more reliable and precise in the prediction of failures of transmission components 12 as the duration of operation increases.

Figure 3:
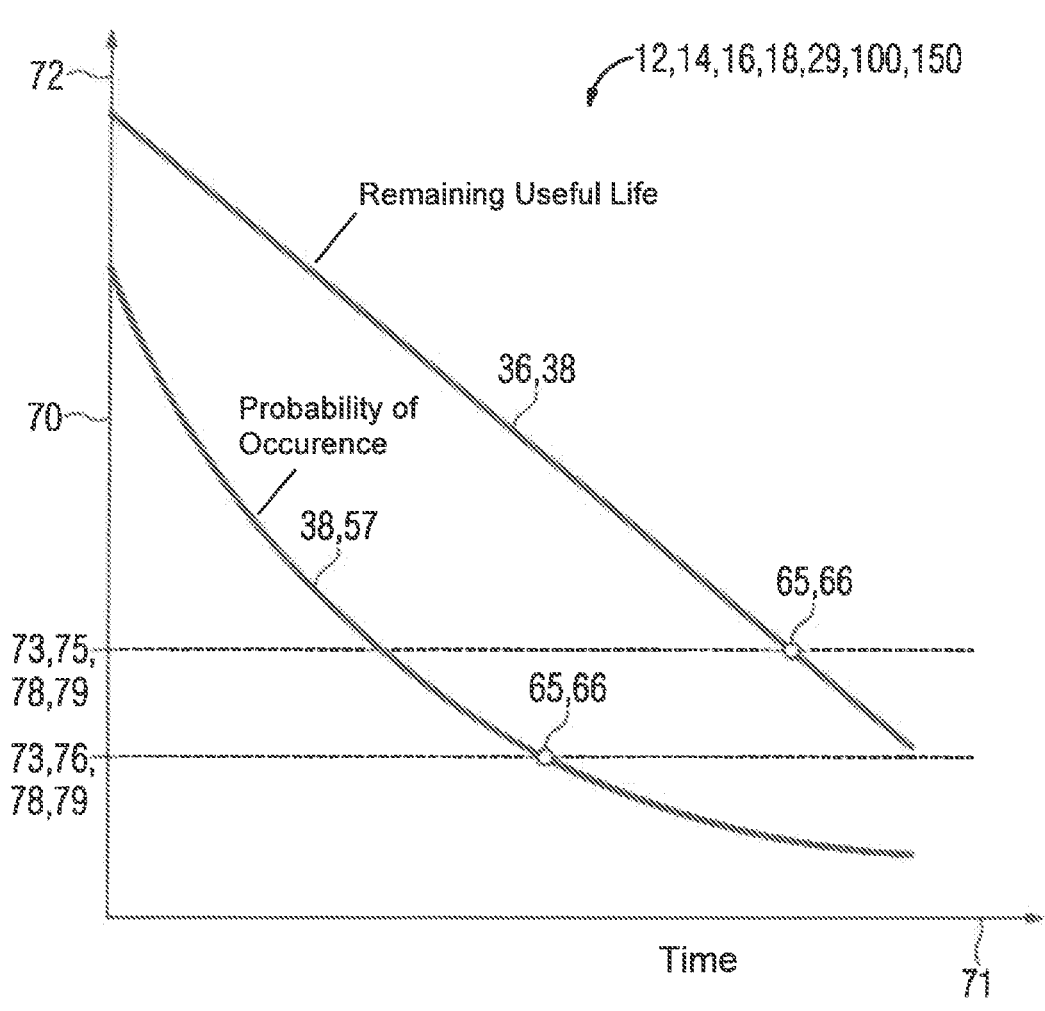
FIG. 3 shows a diagram of a step of the claimed method.
Figure 4:
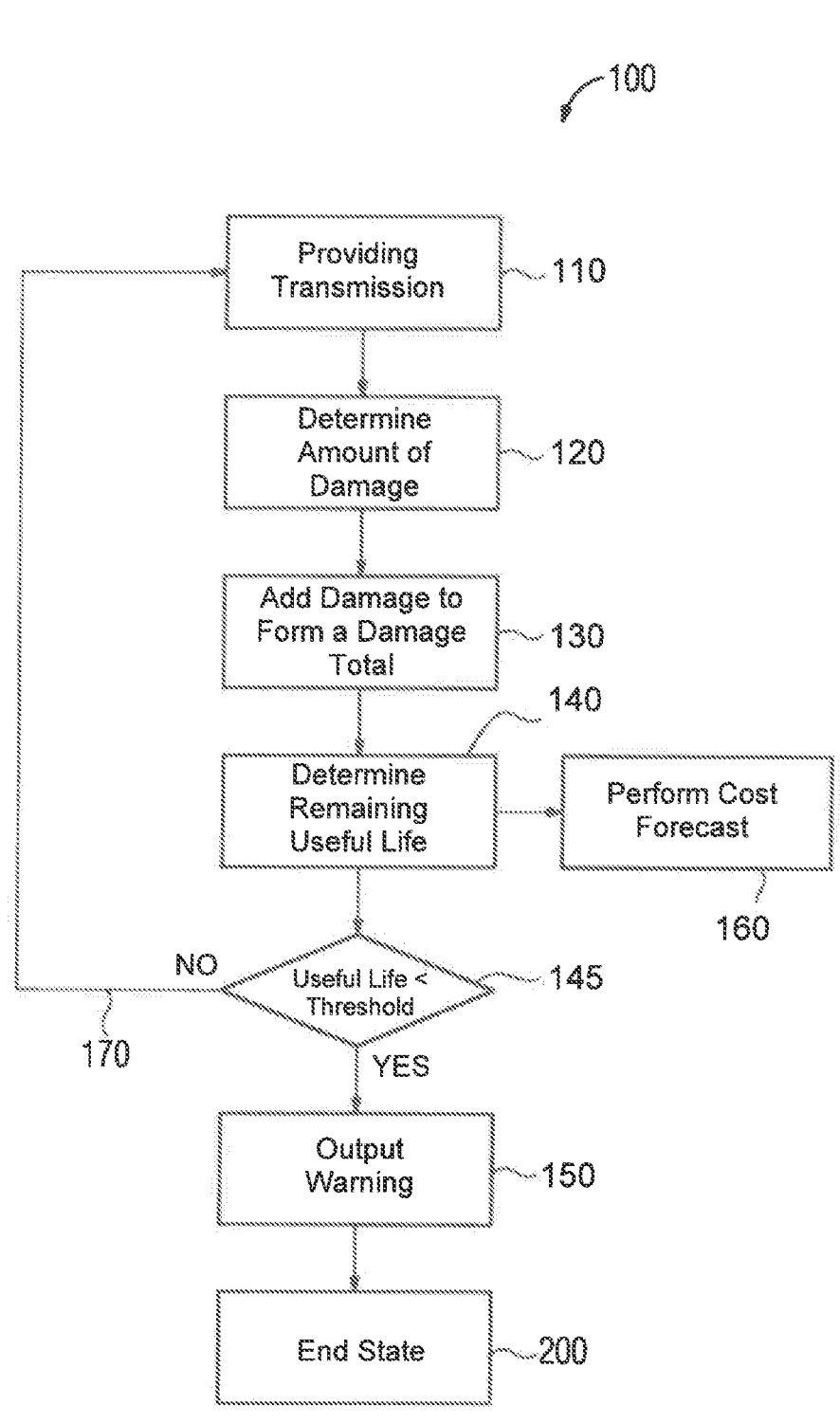
FIG. 4 shows a schematic execution of a second embodiment variant of the claimed method.

FIG. 3 schematically shows a further aspect of the fifth method step 150 of the claimed method 100. In particular, the evaluation diagram 70 shown in FIG. 3 represents a warning or response characteristic of the method 100. The evaluation diagram 70 comprises a horizontal time axis 71 and a vertical magnitude axis 72 relative to which a model remaining useful life 36 and an occurrence probability 57 are indicated. Both variables are shown in FIG. 4 for the first damage mechanism 38 and relate to a transmission component 12 which can take the form of a gearwheel 14, a shaft 16 or a bearing 18. Furthermore, the transmission component 12 is subjected to a specifiable load level 29 along the time axis 71. The model remaining useful life 36 and the occurrence probability 57 decease along the time axis 71. A configurable first threshold value 75 is also defined for the model remaining useful life 36. If the model remaining useful life 36 fails below the first threshold value 75, a warning 65 and/or a stock level statement 66 is triggered. As a result of this, a user is warned or the provision of a spare part is initiated in advance of an impending failure of the transmission component 12. In a similar manner, a configurable second threshold value 76 is specified for the occurrence probability 57. If the occurrence probability 57 falls below the second threshold value 76, a warning 65 and/or a stock level statement 66 is likewise output for the transmission component 12. The first and second threshold values 75, 76 belong to the parameters 73 which, as illustrated in FIG. 1, influence the execution of the method 100 and can be specified by a user input 78 or an algorithm 79.

FIG. 4 schematically shows the execution of a second embodiment variant of the claimed method 100. The method 100 starts from a first method step 110, in which the transmission 10 with the plurality of transmission components 12 is provided, wherein at least one first transmission component 12 is to be monitored. In this case, the transmission 10 is in an operating state 20 in which a mechanical stress 25 on the first transmission component 12 is ascertained using a sensor 22. This is followed by a second method step 120 in which, on the basis of the mechanical stress 25, an amount of damage 35 is ascertained more correspondingly in the context of a configurable defect accumulation model 30 and a configurable first damage mechanism 38. In a third method step 130 following thereupon, the amount of damage 35 is added to a defect total 43 in the defect accumulation model 30 for the first damage mechanism 38. In a subsequent fourth method step 140, a model remaining useful life 36 is ascertained for the first damage mechanism 38 in the context of the defect accumulation model 30. An occurrence probability 57 for the corresponding model remaining useful life 36 is likewise ascertained in the fourth method step 140. In this case, the ascertainment of the model remaining useful life 36 and occurrence probability 57 thereof is based on a configurable load level 29 corresponding to an expected or intended future operation of the transmission component 12 and hence of the transmission 10. The occurrence probability 57 in this case is ascertained with reference to data sets 64 of comparison components 62, by means of which a distribution function 51 of useful lives is established. A sixth method step 160 takes place in parallel with the fourth method step 140 and, on the basis of the model remaining useful life 36 and the occurrence probability 57, performs a cost forecast 67 for a maintenance job for the first transmission component 12. A result of the cost forecast 67 can be displayed to a user. The fourth method step 140 is followed by a first branch point 145, at which the model remaining useful life 36 and/or the occurrence probability 57 from the fourth method step 140 are compared with configurable parameters 73. The configurable parameters 73 also comprise a first and a second threshold value 75, 76 for the model remaining useful life 36 and the occurrence probability 57 respectively. If the threshold values 75, 76 are exceeded, it is confirmed that no operating state is present which requires a response, and the method 100 returns to the first method step 110 via a return loop 170. If the model remaining useful life 36 or the occurrence probability 57 falls below the first and/or second threshold value 75, 76, a fifth method step 150 is performed. In said fifth method step 150, a warning 65 is output and/or a stock level statement 66 for the first transmission component 12 is output. The method 100 finally arrives at an end state 200. The method 100 according to FIG. 4 executes entirely or in a functionally distributed manner in one or a plurality of computer program products 80 which are stored in a non-volatile and executable manner on a control unit 40. The control unit 40 in this case comprises an internal control unit 42 and/or a supervisory control unit 44.

Figure 5:
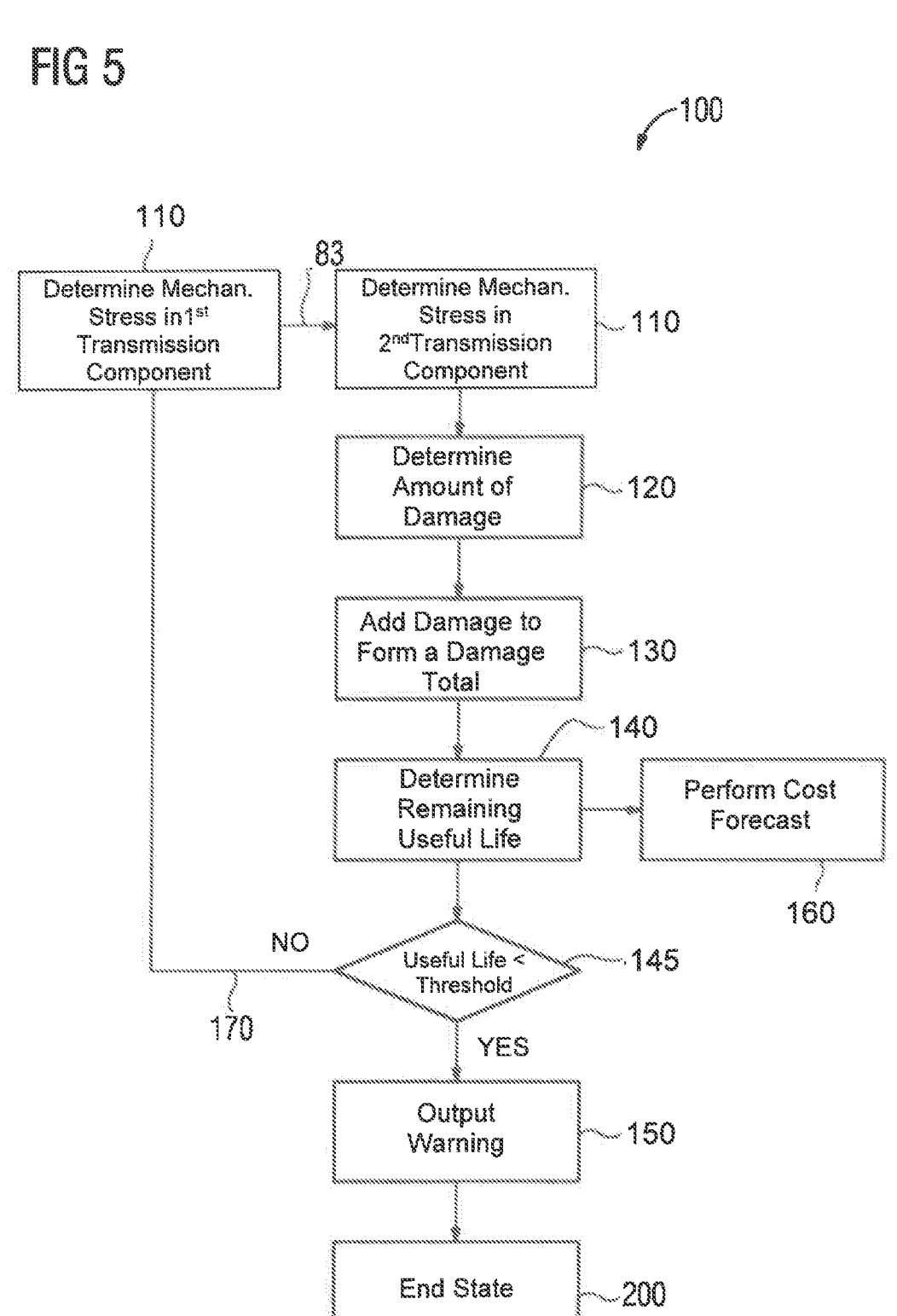
FIG. 5 shows a schematic execution of a third embodiment variant of the claimed method.

FIG. 5 shows a schematic execution of a third embodiment variant of the claimed method 100. The method 100 starts from a first method step 110, in which a mechanical stress 25 on a first transmission component 12.1 in an operating state 20 is ascertained by means of a sensor 22. With the aid of a transfer function 83, a mechanical stress 25 on a second transmission component 12.2 in the same operating state 20 is ascertained therefrom. The first and second transmission components 12.1 and 12.2 belong to the same transmission 10. A transfer function 83 is understood to be a physical relationship between the first and second transmission components 12.1, 12.2, which relationship describes a mechanical stress 25 on the first transmission component 12.1 as essentially a function of the mechanical stress 25 on the second transmission component 12.2. Such a transfer function 83 can take the form of a value table, an algorithm 79 or a simulation. On the basis of the mechanical stress 25 on the second transmission component 12.2, the second, third, fourth, fifth and sixth method steps 120, 130, 140, 150, 160 are performed in a similar manner to FIG. 4.

The first method step 110 is followed by a second method step 120 in which, on the basis of the mechanical stress 25, an amount of damage 35 ascertained more correspondingly in the context of a configurable defect accumulation model 30 and a configurable first damage mechanism 38. In a third method step 130 following thereupon, the amount of damage 35 is added to a defect total 43 in the defect accumulation model 30 for the first damage mechanism 38. In a subsequent fourth method step 140, a model remaining useful life 36 is ascertained for the first damage mechanism 38 in the context of the defect accumulation model 30. An occurrence probability 57 for the correspond model remaining useful life 36 is likewise ascertained in the fourth method step 140. In this case, the ascertainment of the model remaining useful life 36 and occurrence probability 57 thereof is based on a configurable load level 29 corresponding to an expected or intended future operation of the second transmission component 12.2 and hence of the transmission 10. The occurrence probability 57 in this case is ascertained with reference to data sets 64 of comparison components 62, by means of which a distribution function 51 of useful lives is established. A sixth method step 160 takes place in parallel with the fourth method step 140 and, on the basis of the model remaining useful life 36 and the occurrence probability 57, performs a cost forecast 67 for a maintenance job for the second transmission component 12.2. A result of the cost forecast 67 can be displayed to a user. The fourth method step 140 is followed by a first branch point 145, at which the model remaining useful life 36 and/or the occurrence probability 57 from the fourth method step 140 are compared with configurable parameters 73. The configurable parameters 73 also comprise a first and a second threshold value 75, 76 for the model remaining useful life 36 and the occurrence probability 57 respectively. If the threshold values 75, 76 are exceeded, it is confirmed that no operating state is present which requires a response, and the method 100 returns to the first method step 110 via a return loop 170. If the model remaining useful life 36 or the occurrence probability 57 falls below the first and/or second threshold value 75, 76, a fifth method step 150 is performed. In said fifth method step 150, a warning 65 is output and/or a stock level statement 66 for the second transmission component 12.2 is output. The method 100 finally arrives at an end state 200. The method 100 according to FIG. 5 executes entirely or in a functionally distributed manner in one or a plurality of computer program products 80 which are stored in a non-volatile and executable manner on a control unit 40. The control unit 40 in this case comprises an internal control unit 42 and/or a supervisory control unit 44.

Figure 6:
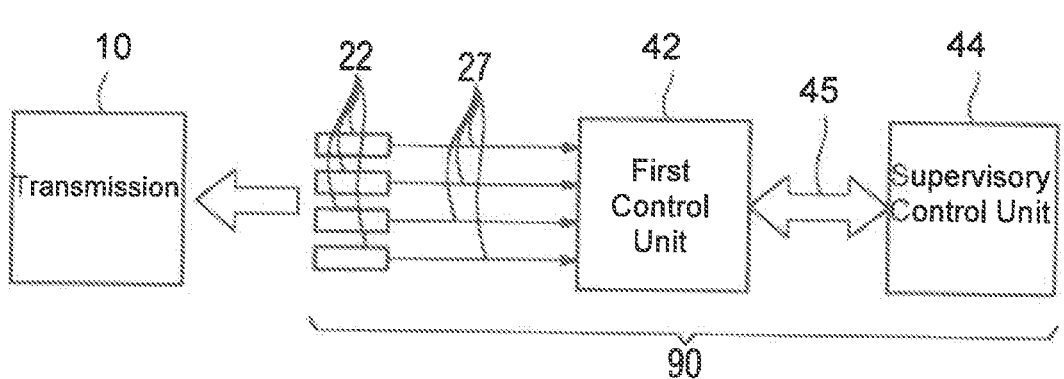
FIG. 6 shows a schematic structure of a claimed monitoring system.

The structure of a first embodiment variant of the claimed monitoring system 90 is depicted in FIG. 6. The monitoring system 90 comprises a plurality of sensors 22 which are designed to indirectly or directly detect a mechanical stress 25 on a transmission component 12 of a transmission 10. In order to achieve this, measured data 27 is transferred from the sensors 22 to a control unit 40 which comprises an internal control unit 42. A computer program product 80 is executably stored in non-volatile form in a storage entity of the internal control unit 42. The internal control unit 42 is designed to receive the measured data 27 from the sensors 22 and process it by means of the computer program product 80. The computer program product 80 has a first part-program 82, which is executably stored in a non-volatile manner on the first control unit 42. The claimed method 100 is partially implemented by the first part-program 82 in at least one embodiment variant. The first part-program 82 is communicatively linked to a supervisory control unit 44 via a data connection 45. Furthermore, a second part-program 84 is executably stored in a non-volatile manner on the supervisory control unit 44, and belongs to the same computer program product 80 as the first part-program 82. Using the communicative data connection 45 between the internal and the supervisory control unit 42, 44, communication takes place between the first and second part-programs 82, 84. The second part-program 84 partially implements the claimed method 100. By means of the communicative data connection 45, the first and second part-programs 82, 84 work together to fully realize the claimed method 100. To this end, the first and second part-programs 82, 84 exchange parameters 73, values from specifications 77 and/or values from algorithms 79.

Figure 7:
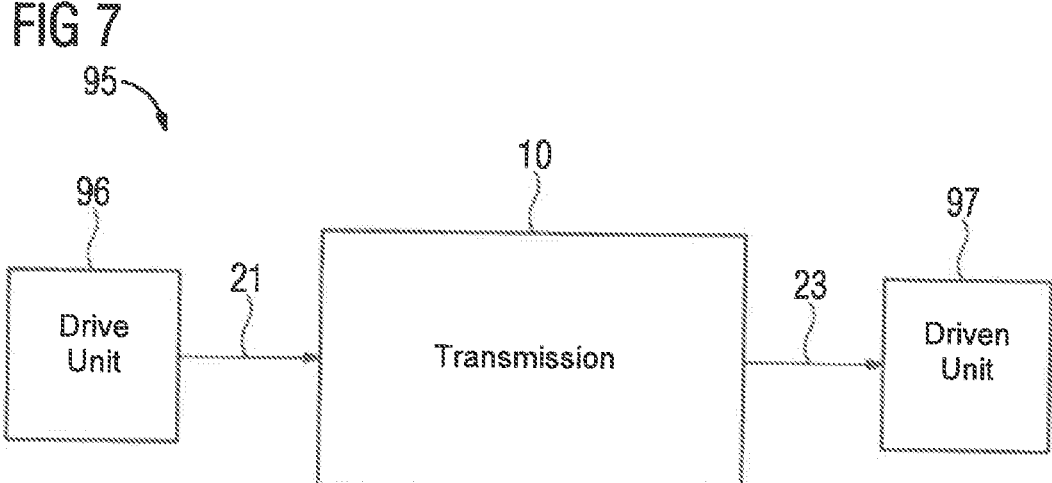
FIG. 7 shows a schematic structure of a claimed transmission application.

FIG. 7 schematically shows the structure of a claimed transmission application 95 comprising a drive unit 96, a driven unit 97 and a transmission 10. The transmission 10 is attached between the drive unit 96 and the driven unit 97. By means of the transmission 10, a driving power 21 is transferred from the drive unit 96 to the driven unit 97 as output power 23, and changed in terms of rotational speed and torque. The transmission application 95 in this case can take the form of an industrial application, a wind turbine, a land vehicle, a watercraft or an aircraft.

The invention claimed is:

1. A method for operating a first transmission for a gearbox for a first transmission application which is configured as a wind power plant or an industrial application and having a plurality of first transmission components, the method comprising:

establishing an operating state of the first transmission and measuring a mechanical stress on one of the first transmission components;

determining an amount of damage to the one first transmission component based on the measured mechanical stress for a first damage mechanism;

determining a mechanical stress on a second transmission component belonging to the same transmission as the one first transmission component in the same operating state with a transfer function which is a physical relationship between the one first and second transmission component describing the mechanical stress on the one first transmission component as a function of the mechanical stress on the second transmission component;

in a first defect accumulation model, adding the determined amount of damage for the first damage mechanism and a second damage mechanism based on the mechanical stress of the second transmission component to a defect total;

determining a model-based remaining useful life of the one first transmission component based on the first defect accumulation model;

determining a probability of occurrence for the model-based remaining useful life based on multiple data sets of corresponding second transmission comparison components of other transmissions employed in second transmission applications deployed in vehicle transmissions, with the corresponding second transmission comparison components having an Identical construction as the first transmission components;

comparing the model-based remaining useful life and the occurrence probability with configurable parameters comprising a first and a second threshold value for the model-based remaining useful life and the occurrence probability respectively, and when the threshold values are exceeded, confirming that no operating state is present which requires a response, and returning to the determining an amount of damage to the one first transmission component based on the measured mechanical stress for the first damage mechanism via a return loop, and when the model remaining useful life and the occurrence probability fall below the first and second threshold values, outputting a warning or a stock level statement for the second transmission component is output; and storing at least one of the model-based remaining useful life, the probability of occurrence, and information about a type of corresponding damage mechanism.

2. The method of claim 1, further comprising outputting a warning when the model-based remaining useful life falls below a configurable first threshold value or the probability of occurrence falls below a configurable second threshold value.

3. The method of the claim 1, wherein the first or second damage mechanism comprise a feature selected from high-cycle fatigue, low cycle fatigue, wear, tooth root breakage and pitting at a toothed gearing.

4. The method of claim 1, wherein the probability of occurrence for the model-based remaining useful life is determined based on a distribution function of permitted defect totals of the comparison components.

5. The method of claim 1, wherein the defect total can be set by using an algorithm or a user input.

6. The method of claim 1, further comprising determining, based on the model-based remaining useful life or the probability of occurrence, an anticipated repair cost for the first transmission component or for the transmission.

7. The method of claim 6, further comprising providing inventory instructions to a materials management system for at least the first transmission component.

8. The method of claim 1, further comprising determining the model-based remaining useful life or the probability of occurrence based on a configurable load level for continued operation of the first transmission component.

9. The method of claim 1, further comprising storing in the data set at least one of the measured mechanical stress, the amount of damage, and the defect total.

10. A computer program product for operating a first transmission application which is configured as a wind power plant or an industrial application, comprising a first part-program embodied in a non-transitory computer readable medium and being either entirely or at least partially in a data connection with a second part-program, wherein the first and second part programs, when loaded into a storage entity of a control unit and executed by the control unit, cause the control unit to perform the steps of establishing an operating state of the first transmission and measuring a mechanical stress on one of the first transmission components;

determining an amount of damage to the one first transmission component based on the measured mechanical stress for a first damage mechanism;

determining a mechanical stress on a second transmission component belonging to the same transmission as the one first transmission component in the same operating state with a transfer function which is a physical relationship between the one first and second transmission component describing the mechanical stress on the one first transmission component as a function of the mechanical stress on the second transmission component;

in a first defect accumulation model, adding the determined amount of damage for the first damage mechanism and a second damage mechanism based on the mechanical stress of the second transmission component to a defect total;

determining a model-based remaining useful life of the one first transmission component based on the first defect accumulation model;

determining a probability of occurrence for the model-based remaining useful life based on multiple data sets of corresponding second transmission comparison components of other transmissions employed in second transmission applications deployed in vehicle transmissions, with the corresponding second transmission comparison components having an identical construction as the first transmission components;

comparing the model-based remaining useful life and the occurrence probability with configurable parameters comprising a first and a second threshold value for the model-based remaining useful life and the occurrence probability respectively, and when the threshold values are exceeded, confirming that no operating state is present which requires a response, and returning to the determining an amount of damage to the one first transmission component based on the measured mechanical stress for the first damage mechanism via a return loop, and when the model remaining useful life and the occurrence probability fall below the first and second threshold values, outputting a warning or a stock level statement for the second transmission component is output; and storing at least one of the model-based remaining useful life, the probability of occurrence, and information about a type of corresponding damage mechanism.

11. A control unit for controlling a first transmission application which is configured as a wind power plant or an industrial application, said control unit arranged at a first transmission as an internal control unit or is installed separately from the first transmission as a supervisory control unit and comprising:

a storage entity, and a computing unit configured to execute a computer program having program instructions stored on a nontransitory computer-readable storage medium, with the program instructions comprising at least one part-program which operates either entirely or at least partially in data connection with a second part-program, wherein the program instructions, when stored in the storage entity and executed by the computing unit, cause the control unit to perform the steps of establishing an operating state of the first transmission and measuring a mechanical stress on one of the first transmission components;

determining an amount of damage to the one first transmission component based on the measured mechanical stress for a first damage mechanism;

determining a mechanical stress on a second transmission component belonging to the same transmission as the one first transmission component in the same operating state with a transfer function which is a physical relationship between the one first and second transmission component describing the mechanical stress on the one first transmission component as a function of the mechanical stress on the second transmission component;

in a first defect accumulation model, adding the determined amount of damage for the first damage mechanism and a second damage mechanism based on the mechanical stress of the second transmission component to a defect total;

determining a model-based remaining useful life of the one first transmission component based on the first defect accumulation model;

determining a probability of occurrence for the model-based remaining useful life based on multiple data sets of corresponding second transmission comparison components of other transmissions employed in second transmission applications deployed in vehicle transmissions, with the corresponding second transmission comparison components having an identical construction as the first transmission components;

comparing the model-based remaining useful life and the occurrence probability with configurable parameters comprising a first and a second threshold value for the model-based remaining useful life and the occurrence probability respectively, and when the threshold values are exceeded, confirming that no operating state is present which requires a response, and returning to the determining an amount of damage to the one first transmission component based on the measured mechanical stress for the first damage mechanism via a return loop, and when the model remaining useful life and the occurrence probability fall below the first and second threshold values, outputting a warning or a stock level statement for the second transmission component is output; and storing at least one of the model-based remaining useful life, the probability of occurrence, and information about a type of corresponding damage mechanism.

12. A transmission application, comprising a transmission arranged between a drive unit and a driven unit and configured to change a rotational speed, said transmission application being embodied as an industrial application or a wind turbine, with the transmission comprising a plurality of first and second transmission components, wherein at least one first transmission component is coupled to at least one sensor associated with a monitoring system for detecting measured data that corresponds to a mechanical stress on the first transmission component, with the monitoring system comprising a control unit connected to the at least one sensor and designed as an internal control unit or as a supervisory control unit, said control unit being designed as set forth in claim 11.

* * * * *